US010429179B2

(12) United States Patent
Richter (10) Patent No.: US 10,429,179 B2
(45) Date of Patent: Oct. 1, 2019

(54) STYLUS HOLDER (71) Applicant: Carl Zeiss 3D Automation GmbH, Aalen (DE)

(72) Inventor: Frank Richter, Heidenheim (DE)

(73) Assignee: CARL ZEISS 3D AUTOMATION GMBH, Aalen (DE)

( * ) Notice: Subject to any disclaimer, the term of this patent is extended or adjusted under 35 U.S.C. 154(b) by 186 days.

(21) Appl. No.: 15/564,953

(22) PCT Filed: Apr. 8, 2016

(86) PCT No.: PCT/EP2016/057688
§ 371 (c)(1),
(2) Date: Oct. 6, 2017

(87) PCT Pub. No.: WO2016/162455
PCT Pub. Date: Oct. 13, 2016

(65) Prior Publication Data
US 2018/0106611 A1 Apr. 19, 2018

(30) Foreign Application Priority Data
Apr. 9, 2015 (DE) .......... 10 2015 206 308

(51) Int. Cl.
G01B 5/012 (2006.01)
G01B 21/04 (2006.01)

(52) U.S. Cl.
CPC .......... *G01B 21/047* (2013.01); *G01B 5/012* (2013.01)

(58) Field of Classification Search
CPC .................................................. G01B 21/047
(Continued)

(56) References Cited

U.S. PATENT DOCUMENTS 4,815,214 A * 3/1989 Enderle .................. G01B 7/002
33/503
5,848,477 A * 12/1998 Wiedmann ............. G01B 5/012
33/503
(Continued)

FOREIGN PATENT DOCUMENTS

DE 9010591 U1 11/1990
DE 102006035540 B3 1/2008

OTHER PUBLICATIONS

International Search Report dated Jun. 24, 2016, of the corresponding International Application PCT/EP2016/057688 filed Apr. 8, 2016.

*Primary Examiner* — George B Bennett
(74) *Attorney, Agent, or Firm* — Norton Rose Fulbright LLC (57) ABSTRACT A stylus holder for a stylus, the stylus having a measuring machine adapter, a shaft, and a stylus tip. The stylus holder includes a body which is designed to receive the stylus and has a moveable securing element on the body. The body has a base which is designed to receive the measuring machine adapter, and the securing element has support surfaces, which can be moved relative to the base plane into a securing position resting on the measuring machine adapter provided in the base, and interaction areas in order to release the securing position of the support surfaces resting on the measuring machine adapter via the areas and/or in order to ensure the securing position by means of a hood or a support.

12 Claims, 8 Drawing Sheets (58) Field of Classification Search
USPC .......................................................... 33/503
See application file for complete search history.

(56) References Cited

U.S. PATENT DOCUMENTS

| | | | | |
|---|---|---|---|---|
| 5,918,378 A * | 7/1999 | McMurtry | ........... | G01B 21/047 33/556 |
| 6,546,643 B2 * | 4/2003 | Lotze | ................. | G01B 21/045 33/503 |
| 9,279,441 B2 * | 3/2016 | Richter | ................. | G01B 5/012 |
| 2008/0016711 A1 * | 1/2008 | Baebler | ................. | G01B 7/012 33/559 |
| 2009/0025243 A1 * | 1/2009 | Prestidge | ............... | G01B 5/012 33/559 |
| 2010/0206068 A1 | 8/2010 | Butter et al. | | |
| 2014/0011444 A1 * | 1/2014 | Groell | ................... | H01Q 21/28 455/39 |
| 2018/0023936 A1 * | 1/2018 | Arai | ..................... | G01B 5/0007 33/503 |
| 2019/0107379 A1 * | 4/2019 | Singh | .................... | G01B 5/012 |

* cited by examiner

STYLUS HOLDER

FIELD

The present invention relates to a stylus for coordinate measuring machines.

BACKGROUND INFORMATION

Conventional styli are used on coordinate measuring machines in order, with the latter, to record the geometry of objects with high precision. To this end, the coordinate measuring machine has an arm to which the stylus is fastened, specifically via an adapter which is typically provided with a thread and from which the shaft and a typically spherical sensing end extend. The measuring machine arm is then moved with the stylus to the workpiece in order to generate a contact-indicating signal upon contact with the workpiece. The geometric dimensions of the workpiece can be determined in the process in that the location of the measuring machine arm during the generation of the contact-indicating signal is recorded at the same time.

Depending on the measuring task, different measuring methods are conventional, for example the point-by-point probing of the workpiece or scanning, in which the stylus is moved over the workpiece while it is in contact with the latter. In order to achieve high levels of accuracy, typically calibration is first of all carried out in that a known body is scanned with the stylus on the arm or known positions are approached therewith. Then, the same arrangement can be used to scan the workpiece. In this procedure, accurate measurements require that no changes to the arm or the sensing means occur between the calibration and the actual measurement of the workpiece.

However, these can occur, for example, when the sensing means changes gradually by probing the workpiece, for instance, because it is moved over the workpiece in continuous contact therewith ("scanning") and is thus subject to abrasion at the front end, or material abraded from the workpiece collects at the tip; both of these scenarios clearly change the geometry of the sensing end and thus falsify measurements. In order to slow down this effect, although the styli are provided with different sensing tips at their front ends in contact with the workpieces, said sensing tips being particularly suitable for the workpiece to be measured in each case and often consisting of ruby, diamond or other, particularly hard materials, in practice, regular stylus exchange and replacement is nevertheless necessary.

However, measurement accuracy is reduced not only when the stylus is subject to gradual wear; changes can also be brought about simply by temperature fluctuations, for instance because the materials of the stylus expand by heating. In order to avoid such effects, if necessary, use is already made of styli which have a very low level of thermal expansion. In addition, styli with spacings of different lengths between the sensing tip and the arm of the coordinate measuring machine are used, wherein, depending on the measuring task, the shaft that determines the spacing can also be mounted perpendicularly on the adapter or at some other angle.

However, this requires regular exchange of styli because wear occurs and because the large number of workpieces of different shapes and different measuring tasks can make different configurations of the styli necessary, for instance with regard to the length of the shaft, the diameter or the shape of the sensing tip, the materials used for the sensing tip, and so on.

The styli therefore represent a tool part that is changed regularly and, if necessary, newly acquired, but which nevertheless needs to be manufactured precisely.

Therefore, the styli have to be produced cost-effectively. In this case, different techniques are used for connecting the sensing-means parts. Thus, the threaded adapter and the shaft are often adhesively bonded, soldered or shrink-fitted; the sensing tip and the shaft, by contrast, are generally adhesively bonded or soldered. This location is particularly susceptible to mechanical damage.

Nevertheless, it is necessary to be able to transport the styli without any risk of damage to the user.

In order to transport the styli, screwable tubes are used, into which the finished styli can be inserted. In order to avoid damage as a result of the stylus moving in the transportation container, padding can be introduced into the tube. However, in this case, it is not possible to rule out a situation in which, for instance, the stylus end gets caught on the padding, damage occurs, etc.

Therefore, transportation packaging already exists in which a cavity is provided, soft ribs projecting towards the middle of said cavity in order to fix a received stylus at the shaft when the ribs bear against the shaft. The cavity structure having the ribs can be flapped away from the shaft such that the latter is exposed and the stylus can be grasped. Over these styli, which are thus fixed in a flexible manner, it is possible to place a hood, thereby protecting the styli for transportation. Corresponding transportation packaging for styli having shaft diameters of between 3 and 6 mm is obtainable, for example, from Rose-Plastik AG, Hergensweiler/Lindau under the name MicroBox.

In such arrangements, it is possible for mixups to occur for instance simply because finished styli are accidentally packaged wrongly after production. This risk increases, the more stylus variants that have sometimes only minor visual differences are produced.

It would be desirable to be able to at least partially satisfy at least some of the indicated requirements.

SUMMARY

It is an object of the present invention to provide innovation for industrial application.

Preferred example embodiments are described herein.

In a first example embodiment of the present invention, a stylus holder is provided for a stylus, which has a measuring machine adapter, a shaft, and a sensing end, having a body which is configured to receive the stylus and has a movable securing means thereon, it furthermore being provided that the body has a base plate which is configured to receive the measuring machine adapter, and the securing means has abutment surfaces which are movable relative to the base plate plane into a securing position resting on the measuring machine adapter provided in the main body, and interaction areas for releasing the securing position of the abutment surfaces resting on the measuring machine adapter via said areas and/or for ensuring the securing position by means of a hood or a carrier.

In accordance with the present invention, it is possible and advantageous to configure a holder for a stylus such that it is usable not just when a completed stylus is to be packaged, but from the outset, in particular, right at the start of assembly. It is also important that the securing means acts reliably on the adapter body, which is configured in a particularly solid and stable manner in styli, such that large forces may act thereon without any risk of stylus damage. In this case, however, only comparatively small forces have to be absorbed by the abutment surfaces when the heavy and solid machine adapter has already been received in a receptacle; this quite considerably reduces the necessary forces which are to be exerted by the securing means, thereby again making it possible to easily release the abutment surfaces from the securing position or, conversely, to achieve the secure abutment thereof against the measuring machine adapter. Thus, as a result of the provision of a base plate having a receptacle for the measuring machine adapter and a securing means having abutment surfaces which are movable relative thereto, it is necessary for only very small forces to be exerted in spite of secure fixing. In this way, secure fixing is allowed without great effort, in order to arrange the measuring machine adapter in the stylus holder during stylus production, before further elements are mounted thereon. The receptacle will typically comprise parts or subregions, or come very close to the measuring machine adapter from several sides, or touch the latter, such that its movement within the receptacle is limited. It is possible to ensure, during the fixing of the measuring machine adapter in the receptacle of the base plate by the abutment surfaces of the securing means resting on the measuring machine adapter, that the abutment surfaces do not touch the stylus shaft or do not protrude beyond that opening in which a shaft is intended to be arranged. In this way, the shaft of the stylus, or the opening therefor, is freely accessibly per se and can be readily mounted, adhesively bonded, visually inspected, etc. It should be mentioned that typically, at least for transportation, the securing means act only on the measuring machine adapter, without coming into contact with the shaft. However, this is not essential; rather, it would also be possible to additionally provide a positioning aid for shaft positioning in the measuring machine adapter. This applies in particular when particularly long shafts have to be mounted; in such a case, it is otherwise readily possible to provide a removable shaft mounting aid on the stylus holder or the carrier(s) thereof, whether this be by way of extensions that are able to be plugged onto the base plate, elements that are integrally formed thereon and are removable after shaft mounting, or the like.

In a preferred embodiment of the present invention, the base plate and the securing means are formed from plastics material. The two may preferably be formed integrally with one another from plastics material, although this is not essential. Given an integral formation of base plate and securing means from plastics material, narrowed structures or structures that have been weakened in some other way are typically provided between the abutment surfaces and the base plate, in order to favor the movement of the securing means. The abutment surface can be moved by deformation of these weaker areas. The fact that a base plate area could optionally be bent slightly as such, in order to fix or release the measuring machine adapter, should be noted, however. As an alternative to an integral formation, a plurality of parts may be fitted together. The fact that, particularly when the holder is formed from several pieces, an abutment surface can be provided with a sliding element, which is moved against the measuring machine adapter to be held, should be noted. It is possible, in the case of stylus holders having an integral formation of base plate and securing means, to provide spring elements such as leaf springs, or, when a plurality of elements are fitted together, a spiral spring similar to those that are conventional in clothespins. The use of plastics parts, in particular integrally injection-molded plastics parts, allows low-cost production and thus favors disposable use. Accordingly, the use of the stylus holder as packaging for shipping itself does not then represent a relevant cost factor compared with conventional packaging, when the stylus holder as a whole is constructed in such a solid and stable manner that it is readily usable in and during the production of the stylus.

As described above, it is advantageous for the abutment surfaces to be movable on account of material flexibility relative to the base plate plane, optionally with slight deformation of the stylus holder, this requiring at least minimal flexibility of the plastics material; it is additionally desirable and advantageous, when the stylus holder is formed with a body made of plastics material, for this plastics material to be able to resist a temperature of more than 100° C., preferably around at least 120° C. Moreover, it is preferred for the plastics material not to become brittle in cold conditions. The sufficiently high temperature resistance makes it possible to use the stylus holder in production even when several components that form a finished stylus are intended to be adhesively bonded together using heat-curing plastics material. This can typically be the case for the connection between shaft and measuring machine adapter. In this case, it is possible to adhesively bond the shaft into the adapter, specifically with adhesive that cures at elevated temperatures, while the measuring machine adapter is located in the holder. Similarly, it is possible to choose the plastics material such that it does not become brittle in cold conditions. This helps when it is desired to subject the measuring machine adapter to cleaning with $CO_2$ snow before the shaft is mounted. It should be noted that it is readily possible to find plastics materials which are both sufficiently temperature-resistant toward high temperatures and also sufficiently flexible, or do not become brittle, in cold conditions. Ultrason, a polysulfone produced by BASF, may be mentioned, for example, as a possible plastics material for the holder and the carrier.

In a particularly preferred variant, the abutment surfaces will be provided on arms which extend away from the base plate plane, that is to say will lie generally parallel to the shaft axis of the inserted, finished stylus. As far as the arrangement generally parallel to a shaft axis is concerned, it should be noted, however, that the shaft axis is not, in the case of all styli, exactly perpendicular to a measuring machine adapter or a surface formed thereon; measuring machine adapters are often formed with a generally cylindrical body which tapers in a conical manner toward the shaft of the stylus at that end of the stylus that is remote from the coordinate measuring machine during use. In such a case, the arms can lie generally parallel to the cylinder surface and the abutment surfaces can be brought into abutment with the conically tapering surface of the measuring machine adapter.

The described geometric design of the measuring machine adapter is not essential, however. Rather, forms are also possible which even taper in a frustoconical manner. In such a case, the arms, too, are typically not necessarily arranged parallel to the shaft axis, but rather are likewise inclined with respect to the shaft axis in a manner corresponding to the opening angle of the truncated cone. In addition, even when for instance generally cylindrical shaping for the measuring machine adapter with a frustoconical taper toward the shaft is provided, i.e., in a frustoconically narrowing manner, it is not necessary for the arms to be strictly parallel to the shaft axis.

It may be advantageous if, in such a case, the arms are inclined for example slightly with respect to the shaft axis, namely toward the shaft axis. In such a case, a preload-type force can be achieved even when the arms are not secured by a hood or a carrier. All that then needs to be ensured is that the arms are not released from the measuring machine adapter when, for instance, an inexperienced user attempts to remove styli from the holder even though they are still in production or are arranged on a carrier from which they must not currently be removed.

It will additionally be clear from the following that advantages may be achieved when, to ensure the abutment of abutment surfaces against the measuring machine adapter, the hood acts in a pressing manner and/or the carrier acts in a spreading manner on the interaction areas in the respective securing position. To this end, the respective contact regions can be inclined slightly with respect to the axis of a stylus standing perpendicularly in its measuring machine adapter, such that the axial fitting of the stylus holder on a carrier or the fitting of the hood can possibly bring about the desired securing action. It should be noted that it is possible to assume a generally parallel orientation in particular when the inclination angle with respect to the shaft axis is less than 15°, wherein the inclination angle typically does not differ from parallel to the shaft axis by more than 10° and preferably not by more than 5° when the measuring machine adapter has a cylindrical or, for other reasons, straight area. When a slight inclination is desired to achieve clamping or spreading of the arms such that the abutment surfaces come into abutment against the measuring machine adapter, inclinations of less than 5° will often suffice.

It is preferred if the stylus holder has a plurality of arms which are moved toward the measuring machine adapter from different sides. In particular, it is possible for two arms to be moved toward the measuring machine adapter from diametrically opposite sides. The movement of the arms toward the measuring machine adapter can take place generally in a radial manner, wherein, however, when an integral formation of base plate and arms has been created with flexible plastics material, it is clearly the case that no exact radial movement will take place but rather a kind of pivoting of the arms toward the measuring machine adapter. It is also possible for this pivoting not to be considered radial in the strictest sense when the plastics material is flexible per se. Although a movement that takes place in the process can also possibly be understood as a pivoting movement, or as a complex movement when the base plate as a whole is slightly deformed in order to release or secure the measuring machine adapter, nevertheless, the movements of the arms are typically so small that, even in such cases, the movement can still be considered approximately "radial" toward the measuring machine adapter. The movement has to be particularly small when latching or form-fitting engagement between abutment surfaces, for the one part, and measuring machine adapter, for the other part, is intended to be achieved. The measuring machine adapter can have grooves, blind holes, channels, one or more cross holes etc., into which correspondingly contoured abutment surfaces of the arms pass in each case. Otherwise, it should be noted that measuring machine adapters often have journals or the like on the side that faces the measuring machine arm in use, in order to ensure that inclined shafts are oriented in the correct direction, etc. In such a case, the stylus holder can clearly have contouring which makes it possible to receive the measuring machine adapter readily in the correct position. This helps the measuring machine adapter to pass into the holder in its correct orientation, and it is also optionally possible for an inclined shaft to be mounted correctly in the required orientation in such a case. The contouring for the engagement of the abutment surfaces with the measuring machine adapter can be realized by a groove, a channel, a blind hole or the like.

In a particularly preferred variant, the stylus holder will have arms on diametrically opposite sides. When the measuring machine adapter is formed by a body with a cylindrical shape, the arms can be provided on curved jaws or be formed by such jaws, which rest on the cylinders or the truncated cone, if appropriate, and in the process can pass into grooves, channels, blind holes and similar recesses or cutouts, if such things are provided therein.

The use with only two arms, jaws or the like and thus the pincer-type grip on the measuring machine adapter has the advantage that enough space can be left between the jaw edges for the stylus nevertheless to still be able to be grasped easily on its measuring machine adapter.

If a plurality of stylus holders are intended to be passed through production together, it is particularly preferred for carriers for the stylus holders to be used, in the case of which the stylus holders fitted in each case are arranged in a row. This is because the arrangement of the stylus holders in a row simplifies the equipping of the carrier and the removal of the stylus holders from the carrier both in the case of manual equipping and also equipping with a gripper arm or the like, and also makes handling easier during production. In order, regardless of the elongate arrangement alongside one another of the styli in their holders on the carrier, to achieve a particularly high packing density, a plurality of carriers should preferably then be connected together, with the result that several rows are located close together. This makes handling easier for instance during heat treatments, during shipping, and so on.

In order, for shipping carriers or putting them into storage, to be able to connect a plurality of individual carriers together to form one surface, form-fitting elements can be formed on the carriers, and these form-fitting elements can be coupled to adjoining carriers in pairs by way of complementary form-fitting elements.

It is also desirable and advantageous if the arms extend both above and beneath the base plate. This allows securing both by fitting a hood or some other attachment, in order to act on the upper arms in a manner pressing radially from the outside, and by way of the carrier, on which the stylus holder can be fitted, in particular during production, to bring about spreading of the arms into the fixing position. Accordingly, the carrier is typically formed in a manner tapering conically upward from its lower base, at least on two opposite sides, in that area on which the holder is fitted in use. This conical formation makes it easier to plug the holders onto the carrier because the holder is centered better and more easily fixed thereby. For these reasons, the conical formation will also be more pronounced than preferred for simply making it easier to produce the carriers for manufacturing reasons. The inclination angle of the conically inclined sides will accordingly be typically about 5 to 10° with respect to the vertical axis.

It should also be noted that the underside of the stylus holder can be formed such that, with particular carriers, a firm abutment of the abutment surfaces is achieved in the securing position on the measuring machine adapter, while with other carriers manual or mechanical actuation of a stylus holder to release the stylus is possible. It should be noted that when stylus holders are fitted on carriers, said carriers can serve to carry a plurality of stylus holders simultaneously. In this way, a series or number of stylus holders can be passed through production together, stylus orders can be made up for customers, sets of styli can be prepared together on coordinate measuring machines, etc.

While it is readily possible to configure the stylus holder such that a separate hood is located over each stylus, this is not essential and it is readily possible to assign a joint hood to a plurality of styli which are arranged jointly on a carrier in their respective holders. In this case, even when large carriers are used for those stylus holders on which a large hood that is jointly used for a plurality of holders is not fitted directly on each holder, for instance because the carrier has a number of gaps, the arrangement on the carrier still results in securing fixing of the styli.

It is particularly preferred if the stylus holder is configured to bear an item of information that characterizes the held stylus. The stylus can be characterized for example by labeling on a suitable, sufficiently large surface. There may be a plurality of mutually separate surfaces, for example in order for a machine-readable optical marking to be provided on one of the surfaces and a marking in plain text to be provided on another surface, the latter allowing a user to immediately identify the stylus. To this end, features such as shaft length, ball diameter, shaft material, etc. can be specified. It is also possible to provide an RFID tag or the like on or in the holder in order to label the stylus.

An example embodiment of the present invention also includes a carrier on which one or more stylus holders according to the invention are able to be fitted. The carrier will typically also be formed from plastics material and be robust enough that it can be used without problems in production or at an end customer's premises on a coordinate measuring machine. The fact that those plastics that are usable for the carrier are also usable for the holder should be noted.

An example embodiment of the present invention also includes a method for producing a stylus using a stylus holder as described above, wherein, in the method, first of all a measuring machine adapter of a stylus is arranged in the receptacle for the measuring machine adapter of the stylus holder and then at least one of the steps is carried out whereby the stylus holder is arranged on a carrier, the stylus holder and/or carrier are labeled; the measuring machine adapter arranged in the receptacle of the stylus holder is cleaned, in particular by means of $CO_2$ snow jet cleaning; a shaft is arranged in the measuring machine adapter, preferably a shaft on which a sensing tip is already provided, for example by being adhesively bonded or soldered in place, wherein the arrangement of the shaft in the measuring machine adapter can also comprise the additional use of adhesive to bond the shaft in the adapter; the adhesive bond is cured in a furnace; visual inspection takes place; and then, optionally following removal of the stylus holder from a carrier, a hood for putting into storage and/or transportation is fitted.

It is clear that, in a preferred method, typically several or all of the steps listed above are carried out.

BRIEF DESCRIPTION OF THE DRAWINGS

The present invention is described below by way of example with reference to the figures.

DETAILED DESCRIPTION OF EXAMPLE EMBODIMENTS

Figure 1:
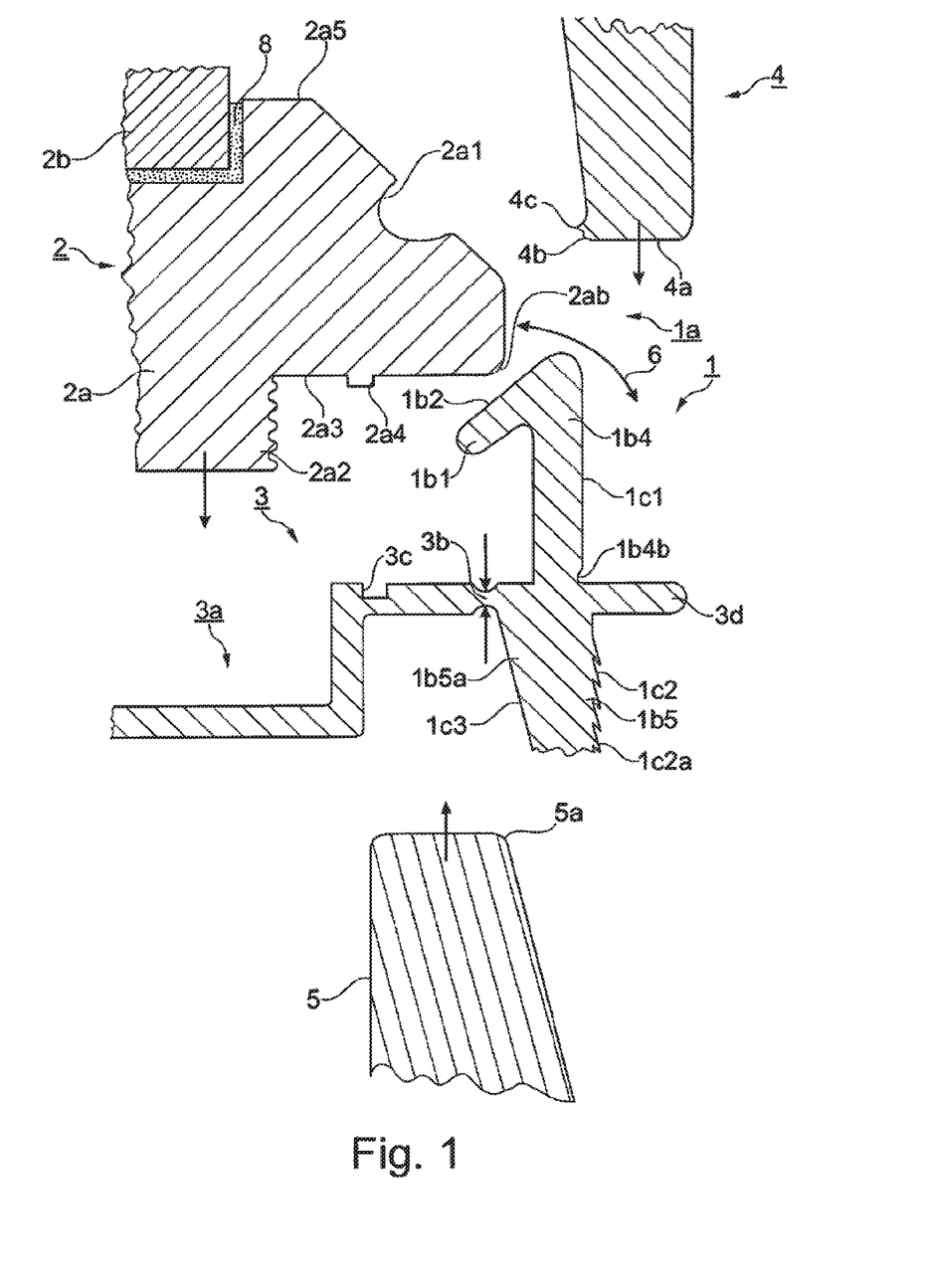
FIG. 1 illustrates a schematic cross-sectional view of one half of a stylus holder according to the present invention with an associated stylus and the parts of a hood and a carrier which are intended to be engaged with the stylus holder to secure the stylus.

According to FIG. 1, a stylus holder 1, bearing the overall reference 1, for a stylus 2 which has a measuring machine adapter 2a, a shaft 2b and a sensing end 2c (cf. FIG. 2c, not illustrated in FIG. 1), comprises a body which is configured to receive the stylus and has a movable securing means 1b thereon, wherein the body 1a has a base plate 3 which is configured to receive the measuring machine adapter 2a in an area 3a, wherein the securing means 1b has abutment surfaces 1b1 which are movable, relative to the plane of the base plate 3, cf. arrow 9, into abutment on the measuring machine adapter 2a provided in the body, cf. indentation 2a1 there, and the securing means has interaction areas 1c1, 1c2, 1c3 in order to compel the securing position of the abutment surfaces 1b1 in abutment against the measuring machine adapter, specifically in the indentations 2a1 there by means of a hood 4, the lower edge of which is indicated, or of a carrier 5, more specifically by means of a carrier surface 5, provided on the carrier, for fitting the stylus holder on its carrier, wherein the interaction of the stylus holder with the hood or carrier surface at the interaction areas forces the securing means into their securing position.

In the present exemplary embodiment, the stylus holder 1 is, as far as possible and preferably, formed integrally from flexible plastics material that does not become brittle in cold conditions and is dimensionally stable at temperatures of up to at least 120° C., and is stable enough to be able to be readily used in production in order to clean a measuring machine adapter 2a arranged in the stylus holder 1, in particular to clean it with $CO_2$ snow, to adhesively bond a shaft 2b provided with a sensing tip into the measuring machine adapter 2a, and to arrange the adhesive from this adhesive bond together with the stylus holder in a heating furnace for curing, and subsequently to arrange the stylus holder with the stylus under a hood 4 and put it into storage, before the stylus in the holder with a hood is shipped. If further steps such as cleaning with liquids and the like are considered necessary, the plastics material of the body 1 is readily designed for such additional stresses. In the exemplary embodiment illustrated, polysulfone is used because it is sufficiently temperature-resistant both in hot conditions and in cold. This material is used here both for the stylus holder 1 and for the carrier 6 thereof, and so both together withstand the same process conditions in production. It should be noted that other materials could be used.

The securing means 1b has, on the side that faces away from the coordinate measuring machine arm in use (from which side the hood is also fitted and toward which the stylus tip is located), a hooked or latching end which, in order to latch in place on the measuring machine adapter or to come into engagement therewith, has an abutment surface 1b1 to which a corresponding indentation 2a1 in the measuring machine adapter 2a is assigned.

In this case, the securing means 1*b* also has an inclined sliding surface 1*b*2 at the hooked or latching end, said surface being inclined and arranged such that, when the measuring machine adapter is inserted into the holder, the radially external lower edge 2*ab* of the measuring machine adapter 2*a* slides thereon and in the process can push the hook away until the measuring machine adapter 2*a* passes with its threaded region 2*a*2 into the area 3*a* for receiving the measuring machine adapter 2*a*.

Figure 2A:
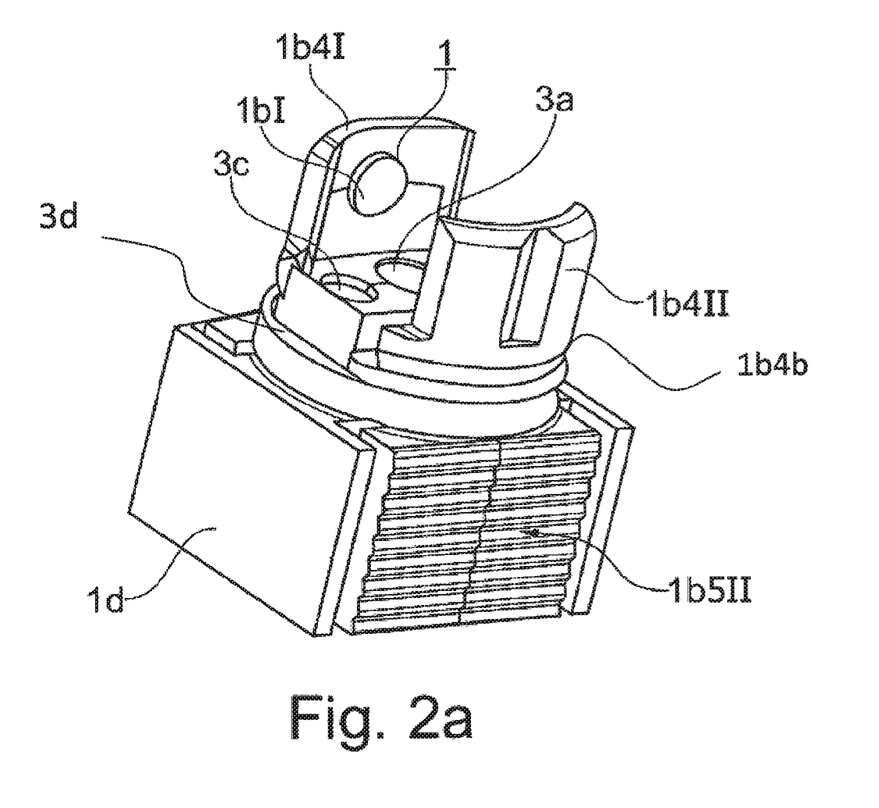
FIGS. 2a and b illustrate a perspective view of a stylus holder according to the present invention, wherein only one half is illustrated.
Figure 2B:
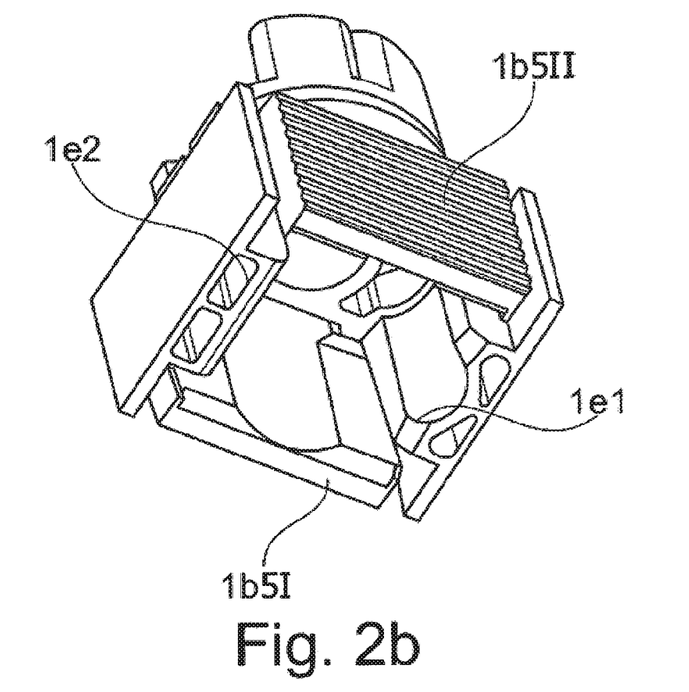
Figure 2C:
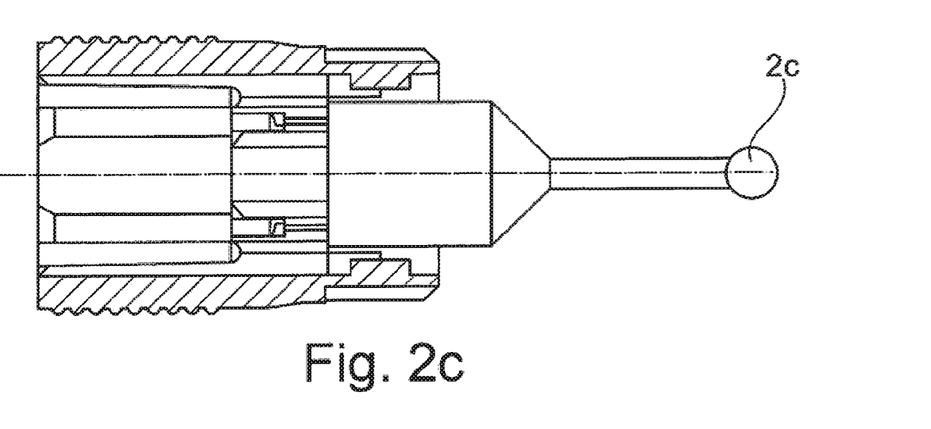
FIG. 2c illustrates the stylus holder from FIGS. 2a and 2b with a stylus inserted.

It is also clear from FIG. 1 and FIG. 2 that the securing means 1*b* also includes two arms 1*b*4 and 1*b*5, wherein one of the arms 1*b*4 is provided above the base plate 3, i.e., toward the stylus 2, and the other arm 1*b*5 is provided beneath the base plate. The arms are configured in such a solid and stiff manner that both arms are moved together when pressure in a radial direction, i.e. in a direction perpendicular to the shaft axis of a shaft normal to the surface 2*a*3, is exerted on one of the arms. In order that the movement of the arms can take place jointly and as pivoting, the base plate is provided, in the area of the transition to the arms, with a narrowing, as is indicated at the location 3*b* in FIG. 1 by the arrows which mark the location of reduced thickness. A generally radial force action on the arms causes deformation of this narrowing 3*b* and thus the latching end is pivoted back and forth, as indicated by the arrow 9.

Radially outside the arms 1*b*4 and 1*b*5, at the level of the base plate 3, an extension for the hood is provided, on which the lower edge 4*a* of the hood 4 can be fitted.

In order, when the hood is fitted, to ensure that the abutment surface 1*b*1 of the securing means 1*b* is located firmly in the indentation 2*a*1, the arm 1*b*4 is provided with a slightly inclined slide-on surface 1*b*4*a* for the edge 4*b* of the hood 4, such that the arm 1*b*4 is pushed inward by the fitting of the hood 4. In order that the hood itself can likewise be retained on the arm 1*b*4, a protrusion or integral formation 4*c* is provided on the lower edge, said protrusion or integral formation passing into an indentation 1*b*4*b* and securing the hood against falling off. The same goes for the arm on the diametrically opposite side.

This integral formation 4*c* will preferably extend around the stylus holder, specifically, as can be seen especially in FIG. 2*a*, at a slight distance from the extension 3*d*. Accordingly, the hood can be flared outward slightly at its outer edge, thereby making it easier to plug on and at the same time, together with the encircling integral formation 4*c*, increasing stability. This is advantageous inasmuch as, in the case of very soft plastics material, which therefore exhibits low brittleness, the hood is not only retained securely but also protected from deformation such that spreading of the arms, releasing a stylus, is reliably avoided.

It should be noted that the FIG. 1 differs from FIG. 2 in that, in FIG. 1, the indentation 1*b*4*b* is arranged immediately above the extension, while, in FIG. 2*a*, the extension 3*d* is illustrated at a slight distance from the indentation 1*b*4*b*. It will be understood from the above that the arrangement shown in FIG. 2*a* is preferred.

The flexibility of the plastics material for the stylus holder 1 is so great that the edge 2*a*1 of the measuring machine adapter 2*a* can easily push the securing means away toward the outside when the measuring machine adapter 2*a* or a complete stylus 2 is inserted into the holder. The pushing away allows the threaded region 2*a*2 of the measuring machine adapter 2*a* to pass into the area 3*a* for receiving the measuring machine adapter 2*a*. Thereafter, the securing means will move back and latch in place on the measuring machine adapter 2*a*. The above-described narrowing of the base plate toward the arms helps to allow this movement of the front end 1*b*3, configured as a latching hook, of the securing means 1*b*, without intrinsically deforming the base plate 3 of the body.

In this case, the narrowing 3*b* is at the same time formed such that the securing means can be moved outward, as described, multiple times without the base plate body fatiguing, and for this reason the measuring machine adapter 2*a* of a stylus 2 can be inserted with its outer edge 2*ab* sliding on the sliding surface 1*b*2 or by pressing onto the interaction surface 1*c*2, which is provided with ribbing 1*c*2*a* for this purpose. The configuration of the plastics body of the stylus holder 1 such that no fatigue occurs, even when the securing means 1*b* is pivoted multiple times with the narrowing 3*b* being deformed, makes it possible not only to mount a stylus in the holder and to ship it, but also to use the holder with the stylus at a user's premises in order optionally to put the stylus back into storage after a measurement has been taken or to keep it on a coordinate measuring machine between two measurements.

Typically, the measuring machine adapter 2*a* of the stylus 2 can have an integral formation 2*a*4 on the surface 2*a*3 which faces the coordinate measuring machine during use, in order to ensure correct orientation of the stylus on the coordinate measuring machine arm thereby when the shaft 2*b* is not perpendicular to a surface 2*a*5, directed toward the workpiece, of the measuring machine adapter. In such a case, the stylus holder 1 can be provided with a corresponding complementary integral formation 3*c* in order to ensure a particular orientation of the stylus in the holder. This may be helpful when hoods 4 formed in particular ways are intended to be used or the stylus is intended to be removable from the stylus holder 1 according to the present invention in a correct orientation for instance during use.

FIG. 4 illustrates in more detail the carrier 6 on which the stylus holder can be fitted during a production process, for transportation and/or storage and for keeping available on a coordinate measuring machine during a measuring task. The carrier 6 is formed in a rectilinear manner and has a number of equidistant elevations, elevations 6*a* to 6*j* in the example, on which the stylus holder can be placed.

Figure 4A:
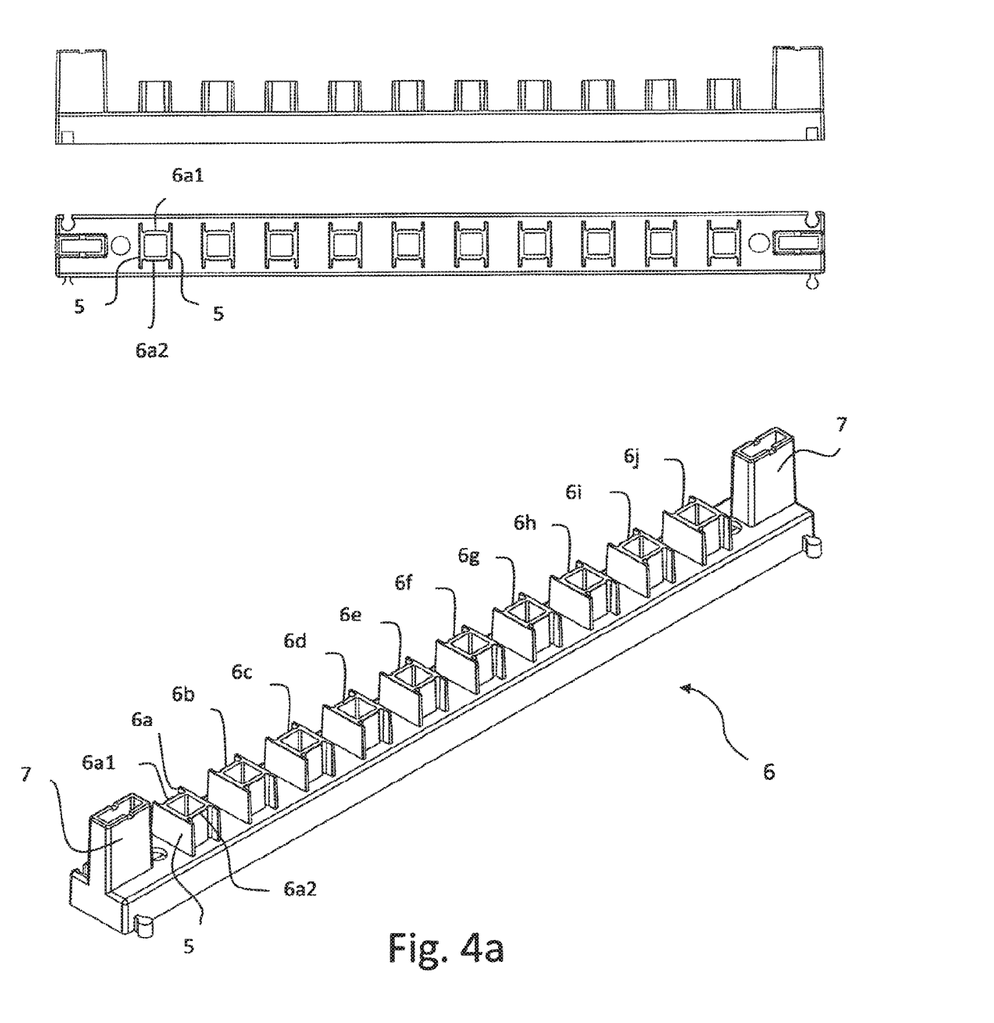
FIG. 4a illustrates an empty carrier from several perspectives.
Figure 4B:
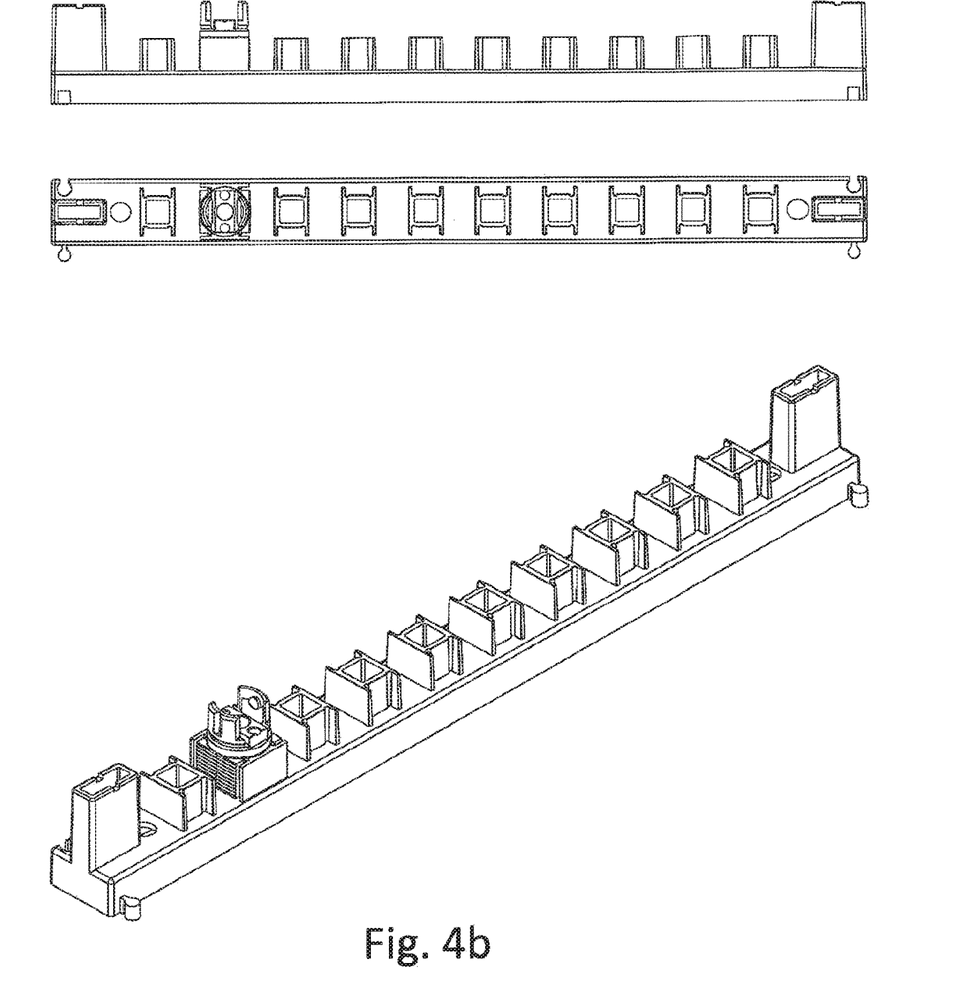
FIG. 4b illustrates the corresponding views of a carrier with an individual fitted empty holder.
Figure 4C:
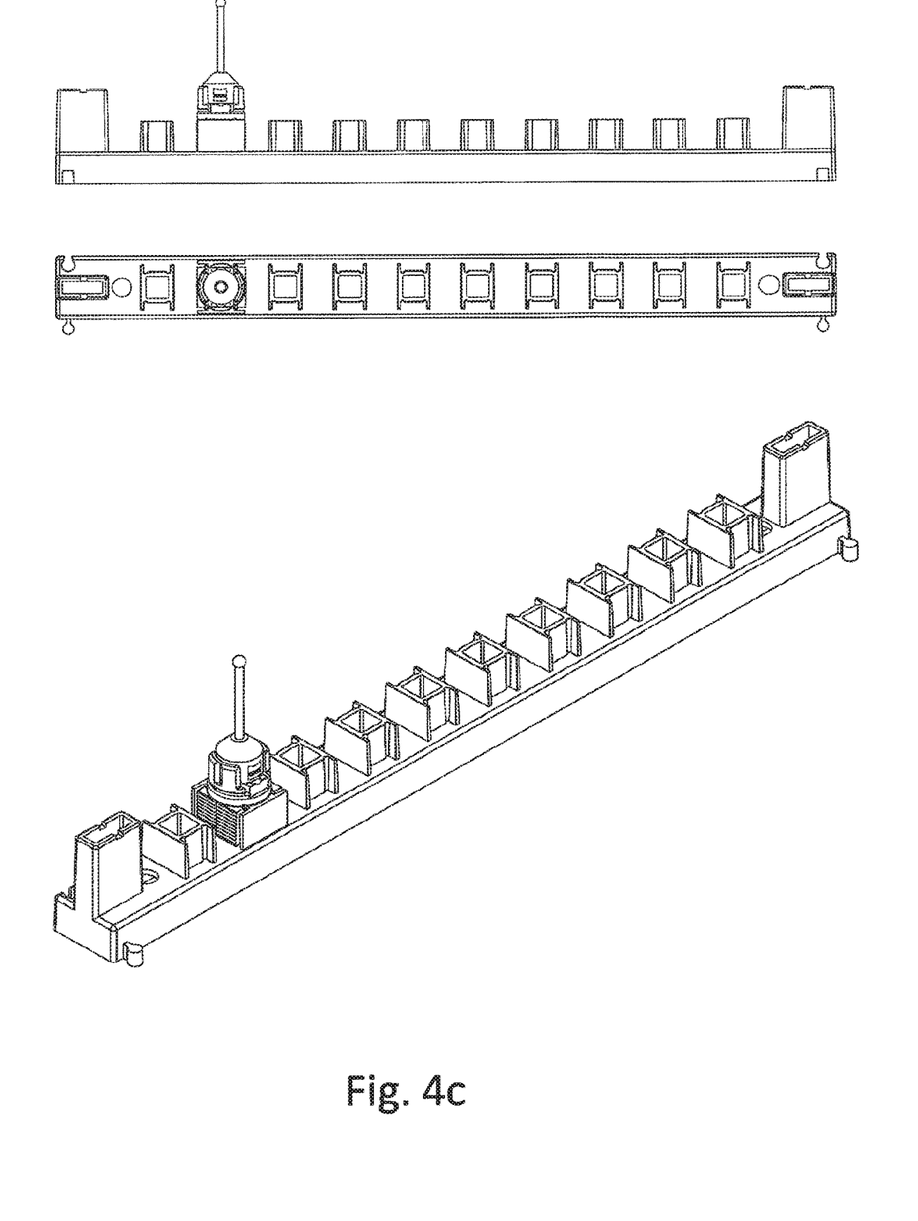
FIG. 4c illustrates the view in FIG. 4b, wherein a stylus is arranged in the holder.
Figure 4D:
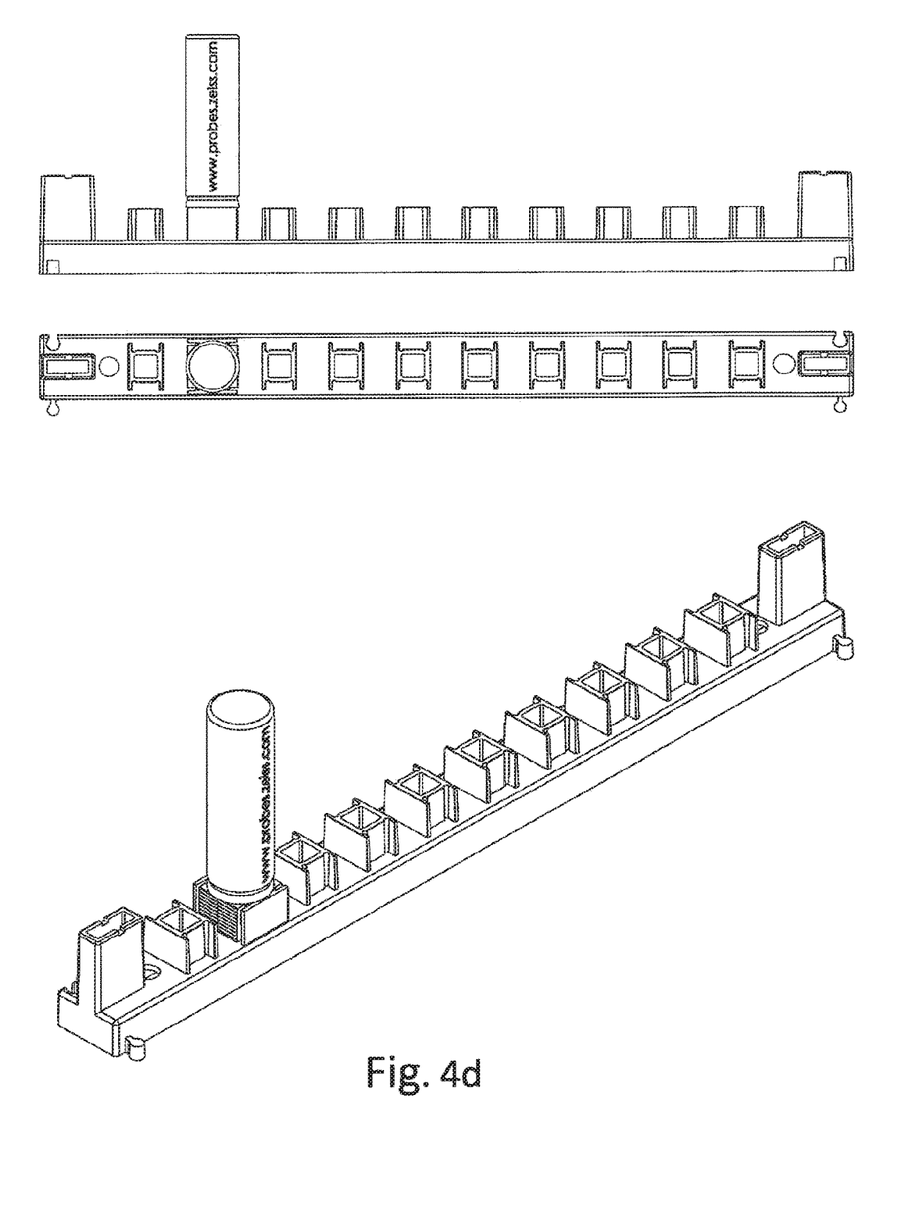
FIG. 4d illustrates the arrangement in FIG. 4c, wherein a hood has additionally been placed on the stylus holder.

Gripping areas 7, by way of which the holder can be grasped, are arranged laterally next to the elevations at the ends of the row.

The individual elevation, for example elevation 6*a*, is formed in each case with two carrier surfaces 5, which taper upward toward one another in a slightly conical manner, as is illustrated in the side view in FIG. 4 and in particular in a readily discernible manner in cross section in FIG. 1. The conical taper makes it easier to plug on the stylus holder and helps the stylus holder to enter into interaction, in its interaction area 1*c*3, with the inclined carrier surface 5 such that the abutment surface 1*b*1 passes into the indentation 2*a*1 and accordingly fixes the measuring machine adapter. The passing of the abutment surface 1*b*1 into the indentation 2*a*1 is favored by the location 3*b* of reduced thickness, since the latter contributes toward pivotability of the abutment surface 1*b*1.

The carrier ribs or carrier surfaces 5 are connected together by transverse structures 6*a*1 and 6*a*2 to increase stability, said transverse structures being offset inward away from the outer edge of the carrier rib, specifically by a distance 1 which suffices to receive the extensions 1*e*1 and 1*e*2 provided on the underside of the stylus holders. If—in contrast to the illustration in FIG. 4—the transverse structures are formed in a complementary manner to the extension 1, a clear orientation of the stylus in the holder is ensured.

A carrier on which stylus holders 1 can be fitted in production or transportation, comprises, for each stylus holder, two generally leaf-shaped carrier surfaces 5, on the edges of which the carrier fits. To this end, the lower arm 1b5 is provided on its radially internal side with an inclined surface which forms the interaction area 1c3b, wherein the shape of the carrier surface 5, the inclination and the intermediate area between the arm 1b5, for the one part, and the outer side of the wall provided to form the area 3a for receiving the thread 2a2 of the measuring machine adapter 2a, for the other part, are coordinated with one another such that, when the stylus holder is fitted on the carrier, the lower arm is pushed outward by the carrier surface 5 in order in this way to bring about pivoting of the upper arm 1b4 such that the bearing surface 1b1 is pushed into the indentation 2a1 in the measuring machine adapter 2a and secure fixing of the measuring machine adapter 2a to the stylus holder 1 is ensured.

In order to secure the stylus holder 1 against falling off the carrier 6, an indentation such as a shallow groove is provided on the inner side of the arm 1b5, close to the base plate 3, said indentation coming into engagement with a complementary integral formation, i.e., in the example, an elevated (and complementary) integral formation, on the carrier surface 5 when the stylus holder is fitted on the carrier surface, in order to fix the stylus holder 1 to the carrier.

In FIG. 1, it is at the same time apparent that the outer surface is inclined somewhat from the lower base to the upper edge, this resulting, together with the outer surface of the opposite side, in conical tapering.

It can be seen from the perspective view in FIG. 2a that the stylus holder has, as preferred, two diametrically opposite securing means for fixing a measuring machine adapter (not shown in FIG. 2a). For a stylus holder having a cylindrical measuring machine adapter, the securing means can be provided with jaws that are curved in a manner corresponding to the cylinder radius of the measuring machine adapter and are designated 1b4I and 1b4II in FIG. 2a in a manner corresponding to the reference sign 1b4 for the arm of the securing means in FIG. 2a. Such an arrangement with diametrically opposite jaws has the advantage that, in order to remove a stylus, the associated lower arms 1b5II and 1b5I can be pressed together with the index finger and thumb of one hand, while the stylus can, if necessary, be removed from the holder with the other hand. The jaws 1b4I, 1b4II to this end extend around the cylindrical measuring machine adapter only far enough for a sufficiently large gripping surface to be available. As can be seen in FIG. 2a, a zone 1d, to which labeling can be applied in order to indicate details about the stylus to be held, is provided on each of the surfaces transverse to the ribbed contact surfaces of the arms 1b5I, 1b5II. The labeling can be carried out in particular by machine with machine-readable code and/or in plain text; it should additionally be noted that, additionally or alternatively, RFID tags can be provided on the holder in order to allow the holder and/or the stylus located therein to be identified.

The lateral surfaces which bear the zones 1d are provided on their inner sides, in the area between the arms 1b5I, 1b5II, with a protrusion 1e1, 1e2 which prevents the arms 1b5I, 1b5II from being able to be pressed inward as far as desired. The protrusions or extensions 1e1, 1e2 thus serve as stops for the arms 1b5I, 1b5II. The width of the extensions 1e1, 1e2 determines how far the arms can be pressed together. This width is selected such that the arms 1b5I, 1b5II can first of all be pressed inward until the jaws 1b4I, 1b4II completely release the stylus 2 and the latter can be removed easily. In this case, the extensions 1e1, 1e2 are nevertheless wide enough that the arms are not moved too far even in the event of excessive force application and therefore the stylus holder is protected from destruction thereby. Overstretching of the narrowing 3b is accordingly prevented.

It should otherwise be noted that the present application refers to pivoting of the securing means 1b, or to a radial movement of the hooks. In this case, it is already clear from the above that the actual movement, which is denoted "radial" in simple terms in the present application, only takes place in an approximately radial manner. In addition, it goes without saying that, if necessary, a narrowing 3b does not have to be provided on the base plate body, and thus the stylus 2 could also be released from the stylus holder 1 for instance by base plate deformation and furthermore possibly a combination of both deformation of the base plate body at the narrowing and also of the remaining area in fact takes place even in the exemplary embodiment illustrated in FIG. 1, such that the movement, denoted pivoting movement here, of the abutment surface 1b1 relative to the base plate in any case does not represent a pure pivoting movement.

Figure 3:
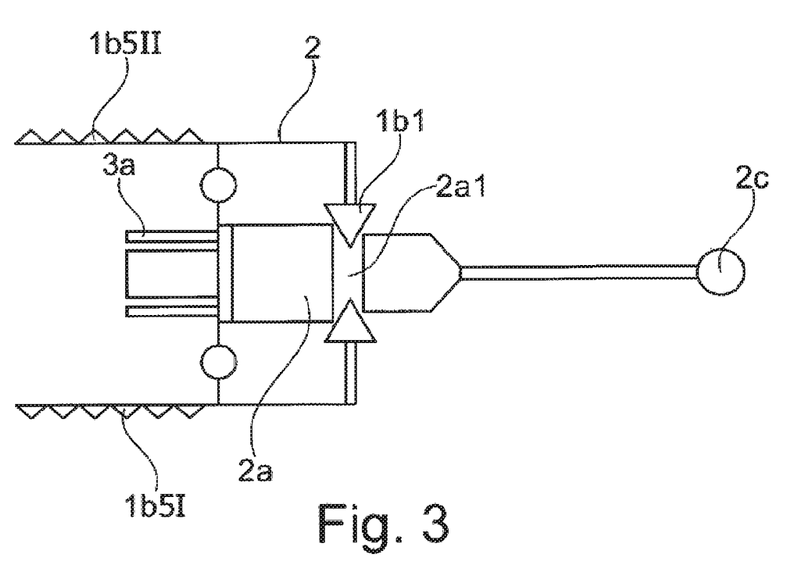
FIG. 3 illustrates a schematic cross-sectional view through a further stylus.

It should also be noted that other configurations than those indicated above may be possible. FIG. 3 shows such another exemplary embodiment, which is provided there with a hinge or the like, as is indicated at reference sign 10 in the exemplary embodiment in FIG. 3. Although the function of the individual elements is readily apparent to a person skilled in the art, the same reference signs are added in FIG. 3, at least for particular elements, as in FIGS. 1 and 2 in order to also make the functionality of the outlined arrangement clear to a technically naive reader.

Returning to FIG. 2b, it should be noted that the underside is preferably configured, in this case by contouring of the extensions 1e1, such that a stylus holder can be placed on an associated carrier only in a particular orientation. This affords advantages in that a given orientation of the stylus in the stylus holder can be achieved precisely by the integral formations 2a4 on a measuring machine adapter and the complementary formation 3c on the base plate of the stylus holder. This shaping, such that the stylus holder can be placed on a carrier only in a particular orientation, ensures that, for instance in the case of a coordinate measuring machine, the stylus is available on a carrier in a correct and expected manner.

In addition, it is thus more easily possible for the correct styli always to be available—if, specifically, a correct orientation of the holder is compelled by the carrier such that one stylus-holder surface always faces forward, which is labeled with plain text or in a machine-readable manner, the equipping of the holder can be readily checked quickly, thereby ensuring the use of the styli that are correct for a specific measuring task. The arrangement of identification surfaces parallel to the longitudinal edge and the arms that are located between the individual holders and are movable toward one another by pressure, contributes to ensuring that, when the carrier is handled, a stylus is not accidentally grasped and removed.

The arrangement is used as follows:

First of all, a measuring machine adapter 2a, on which a shaft 2b is not yet located, is plugged into an as yet unlabeled stylus holder 1. While the measuring machine adapter is being plugged in, its edge 2ab slides over the sliding surface 1b2 of the arm 1b4 and pushes the latter outward in the process, whereupon the abutment surface 1b1, on being pushed in further, slides past the shape, tapering conically upward as far as the provided sensing end, of the measuring machine adapter 2 until the abutment surface 1b1 passes into the indentation 2a1, whereupon the arm 1b4 is pushed back into its starting position on account of the elasticity of the plastics material of the base plate 3. The same takes place on the side that is not shown. This fixes the measuring machine adapter in the holder.

The measuring machine adapter 2a is thus securely held on the stylus holder 1, as long as it is ensured that the arm 1b4 does not move outward. To this end, for further production, a plurality of stylus holders, which are provided with measuring machine adapters 2a without shafts 2b, are arranged together on a carrier. As a result of each stylus holder 1 being fitted on the associated carrier surface 5, the lower arm 1b5 is moved slightly outward and it is ensured that it cannot move inward, i.e. toward the axis of the provided shaft. On account of the integral configuration of the stylus holder and in particular on account of the largely rigid connection between the lower arm 1b5 and upper arm 1b4, this ensures that the abutment surface 1b1 remains within the indentation 2a1 in the measuring machine adapter. It is thus ensured that the measuring machine adapters remain in the holders because the abutment surfaces 1b1 are prevented by the carrier from disengaging from the corresponding indentation 2a1.

The measuring machine adapters in the stylus holders on the carrier are now cleaned together, and this can take place for example by way of $CO_2$ snow cleaning.

In this way, the measuring machine adapters per se are prepared in order to adhesively bond a shaft 2b therein, which is usually already provided with a stylus tip. However, it should be appreciated that, in many cases, different shafts and/or shafts with different sensing tips, for example sensing balls made of different materials and with different diameters have to be arranged on a carrier. In order to avoid confusion from the outset, the zones 1d are already labelled before the corresponding shafts are mounted. Such labelling can be carried out by a laser while the holders are arranged on the carrier. To this end the carrier is configured as illustrated, such that it can be guided easily through machines, which can take place either automatically by a machine and/or manually.

After the holders have been labelled and thus marked with information about the styli to be fitted in each case, the corresponding shafts are then mounted. To this end, adhesive is introduced in a suitable manner into a recess in the measuring machine adapter 2a for the shaft 2b; the adhesive will in this case be a heat-curing adhesive. Subsequently, the shafts themselves can be inserted.

After the correct shafts have been inserted into all the measuring machine adapters, the entire carrier, together with the holders and the measuring machine adapters arranged therein, into which the shafts have been inserted in turn, but the adhesive bond of which has not yet cured, are moved into a heating furnace, where all of the styli are jointly heated on the carrier to such an extent that the adhesive 8 cures.

After the adhesive 8 has cured, the carrier is removed from the furnace and cooled as necessary.

It should be noted in this regard that the carriers are able to be arranged in rows alongside one another in a preferred variant, to which end form-fitting elements can preferably be provided on both longitudinal edges, which can engage with corresponding form-fitting elements on longitudinal edges of other carriers. In this way, it is possible not only to simultaneously handle a larger number of elements but also to be able to access all of the currently relevant styli easily on a coordinate measuring machine. This is advantageous precisely in order to subject a relatively large number of styli to a heat treatment, to store styli, etc.

Following visual inspection, which can take place while the stylus holders are still on the carrier, and optionally further cleaning, the hoods 4 can be fitted on the individual stylus holders. In this case, the edges of the hoods 4 slide along the inclined surface 1b4a of the upper arms 1b4 of the stylus holder 1 and press said arms inwards, if this is still possible and necessary. Like the fitting of the stylus holders 1 on the carrier 6, this likewise ensures, independently of the carrier, that the abutment surfaces 1b1 remain in the indentations 2a1.

The individual hood is in this case fitted on the stylus holder to such an extent that it sits on the extension 3d of the base plate 3 and the complementary formations 4c and 1b4b engage. Thereafter, the hood is secured to the stylus holder and firm abutment of the abutment surface 1b1 engaged with the indentation 2a1 still ensured even when the stylus holder 1 is removed from the carrier 6. The stylus holder 1 can now be removed from the carrier and, optionally after intermediate storage, shipped.

At the end user's premises, the stylus holder can be fitted on a carrier of a coordinate measuring machine, which, unlike the above-described production carrier, is configured such that the arms 1b5I, 1b5II can be pivoted inward, for example by mechanical actuation, thereby releasing the stylus for automatic removal from the stylus holder. Subsequently, the hood 4 can be removed from the stylus holder 1.

If, while the styli are being used, a stylus is damaged and/or wear occurs, the stylus itself can be disposed of as usual, while the stylus holder provided with a marking is collected in a collection box for reordering. At a given time, the collected stylus holders and the labels thereon can be used to determine which styli need to be reacquired.

As is apparent from the above, it is particularly advantageous for that indentation in which the shaft sits during use, to be kept free from the outset and also be freely accessible, such that the shafts can be mounted while the machine adapter is arranged in the stylus holder according to the invention.

The invention claimed is:

1. A stylus holder for a stylus, the stylus including a measuring machine adapter, a shaft, and a sensing end, the stylus holder comprising:
a body which is configured to receive the stylus and has a movable securing element thereon, wherein the body has a base plate configured to receive the measuring machine adapter, and wherein the securing element has abutment surfaces which are movable relative to a plane of the base plate into a securing position resting on the measuring machine adapter provided in the body, and interaction areas for at least one of: (i) releasing the securing position of the abutment surfaces resting on the measuring machine adapter via the interaction areas, and (ii) ensuring the securing position by means of a hood or a carrier.

2. The stylus holder as recited in claim 1, wherein the base plate and the securing element are formed from plastics material.

3. The stylus holder as recited in claim 2, wherein the base plate and the securing, element are formed integrally from the plastics material.

4. The stylus holder as recited in claim 1, wherein the plastics material is at least one of: (i) flexible, (ii) temperature-resistant up to at least 120° C., and (iii) does not become brittle in cold conditions.

5. The stylus holder as recited in claim 1, wherein the abutment surfaces are provided on arms which extend away from the base plate plane parallel to the shaft axis.

6. The stylus holder as recited in claim 1, wherein a plurality of arms are provided and arranged such that, in use, the arms move toward the measuring machine adapter from different sides.

7. The stylus holder as recited in claim 6, wherein the arms move at least one of: (i) radially toward the measuring machine adapter, and (ii) into form-fitting engagement with contouring provided thereon, the contouring being at least one of a groove and a cross hole.

8. The stylus holder as recited in claim 6, wherein the arms are provided on two diametrically opposite sides, and, in use, the arms move toward the measuring machine adapter from opposite sides, and wherein the arms are designed such that the stylus can be grasped easily.

9. The stylus holder as recited in claim 6, wherein the arms extend above and below the base plate, and wherein at least one of: (i) the interaction areas for the hood are arranged above the base plate radially on the outside of the arms, and (ii) the interaction areas for the carrier are arranged radially on the inside of the arms, such that when the hood is fitted, the arms are pressed inward and when the stylus holder is fitted onto a carrier, the arms are spread outward.

10. The stylus holder as recited in claim 6, wherein the stylus holder is is configured to pick up a characteristic of the held stylus.

11. A carrier for a stylus holder, the stylus holder including a body which is configured to receive the stylus and has a movable securing element thereon, wherein the body has a base plate configured to receive the measuring machine adapter, and wherein the securing element has abutment surfaces which are movable relative to a plane of the base plate into a securing position resting on the measuring machine adapter provided in the body, and interaction areas for at least one of: (i) releasing the securing position of the abutment surfaces resting on the measuring machine adapter via the interaction areas, and (ii) ensuring the securing position by means of a hood or the carrier, the carrier comprising:
carrier surfaces which are provided for fitting the stylus holder and on which engaging elements for engaging with the interaction areas of the securing element of the stylus-holder are provided to ensure a securing position of the abutment surfaces resting on the measuring machine adapter.

12. A method for producing a stylus using a stylus holder, the stylus holder including a body which is configured to receive the stylus and has a movable securing element thereon, wherein the body has a base plate configured to receive the measuring machine adapter, and wherein the securing element has abutment surfaces which are movable relative to a plane of the base plate into a securing position resting on the measuring machine adapter provided in the body, and interaction areas for at least one of: (i) releasing the securing position of the abutment surfaces resting on the measuring machine adapter via the interaction areas, and (ii) ensuring the securing position by means of a hood or a carrier, the method comprising:
arranging a measuring machine adapter in a receptacle for a measuring machine adapter; and carrying out at least one of the following:
arranging the stylus holder on the carrier;
labelling at least one of the stylus holder and the carrier;
cleaning the measuring machine adapter located in the receptacle, by means of $CO_2$ snow jet cleaning;
with adhesive having been introduced into the measuring machine adapter beforehand, at least one of: (i) arranging a shaft in the measuring machine adapter, the shaft provided with a stylus, and (ii) curing adhesive bonds;
visual inspection; and
following removal of the stylus holder from the carrier, fitting a hood for putting into at least one of storage and transportation.

\* \* \* \* \*